Dec. 28, 1965 A. KOLLER ETAL 3,226,680

PULSE RESPONSIVE RECEIVER HAVING PLURAL DELAY STAGES IN ACCORDANCE WITH A PARTICULAR PULSE CODE

Filed May 22, 1961 2 Sheets-Sheet 2

United States Patent Office 3,226,680
Patented Dec. 28, 1965

3,226,680

PULSE RESPONSIVE RECEIVER HAVING PLURAL DELAY STAGES IN ACCORDANCE WITH A PARTICULAR PULSE CODE

Alois Koller and Gottfried Tschannen, Zurich, Switzerland, assignors to Albiswerk Zurich A.G., Zurich, Switzerland, a corporation of Switzerland Filed May 22, 1961, Ser. No. 111,554
Claims priority, application Switzerland, May 23, 1960, 5,872/60
6 Claims. (Cl. 340—167)

Our invention relates to a selective call system in which the selection of one of a number of receivers is effected by means of a group of selector pulses that follow a starting pulse, and in which the time spacing between the selector pulses serve as selection criteria.

Each receiver in such a system responds only to one predetermined sequence of selection criteria; i.e., time spacings, between incoming pulses. For this purpose each receiver comprises pulse-delay stages equal in number with the number of selection criteria. Also included in the receiver is a signal generator stage which operates to issue a signal upon response of the receiver to the correct sequence of time spacings. The duration and sequence of the pulse delays are a characteristic of the respective receivers. The delay stages and the signal generator stage are connected sequentially through conicidence gates and become active one after the other, provided the time spacing between the selector pulses coincide with the delay periods assigned thereto in the sequence.

In a known selective call system of this type, the end pulse of a selection criterion simultaneously constitutes the starting pulse of the next following selector criterion. The end flank or trailing edge of a delayed pulse causes the next pulse delay stage to respond if this end flank coincides with the next following selector pulse. Enlarging such a call system for a higher number of subscribers (selectively callable receivers) is limited by the attainable accuracy of the pulse lengths and pulse spacings. This limitation, however, is partially obviated if the step lengths of the selective pulse spacings are not equal to each other but follow a geometric series. In this case, the selector pulses must also be different, in accordance with the lengths of the selector criteria, in order to compensate for the greater inaccuracies involved in longer selector criteria. The last selector pulse must compensate for the sum of all inaccuracies and consequently must have a longer duration than all preceding selector pulses.

It is an object of our invention to improve selective call systems of the above-mentioned type by eliminating the compensating requirements just mentioned, thus affording a simplification and improved reliability of equipment and operation.

To this end, and in accordance with a feature of our invention, the receivers of the selective call system are such that the output pulse of each pulse-delay stage releases a gating pulse which opens the next following coincidence gate, and that a succeeding selector or input pulse is supplied to the pulse-delay stages that follow upon the first pulse-delay stage, and to the signal generator stage, only if the end flank of the succeeding selector pulse coincides with the gating pulse.

The foregoing and more specific features of our invention, set forth with particularity in the claims annexed hereto, will be described and explained in the following with reference to the embodiment of a selective call system according to the invention illustrated by way of example on the accompanying drawings in which:

FIG. 2 is the complete circuit diagram of the same receiver, while

The illustrated embodiment constitutes a receiver for a selective call system, for radio transmission of call signals in response to a selector code composed of two selector criteria.

Figure 1:
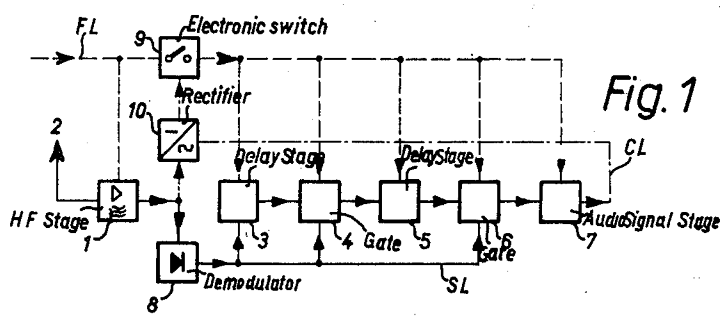
FIG. 1 is the block diagram of a receiver.

As shown in the block diagram of FIG. 1, the receiving device comprises a high frequency stage 1 for amplifying a call signal received by an antenna 2 in form of a pulse-modulated, high-frequency oscillation with a carrier frequency; for example, with the modulation used in this embodiment, the selector pulses represent current pauses in the otherwise continuous high frequency signal of 30,000 c.p.s. The receiver further contains two pulse-delay stages 3, 5 and a signal generator stage. These stages are connected in cascade through coincidence gates 4 and 6. The selector pulses coming in through antenna 2 and stage 1 are de-modulated in a de-modulator 8 and are supplied to the first pulse-delay stage as well as to the coincidence gates 4 and 6. The output pulse of each delay stage 3, 5 releases a gating pulse for opening the next following coincidence gate 4 or 6. The second pulse-delay stage 5 and the signal-generator stage 7 receive an input pulse, only if the end flank of the second and third selector pulses respectively coincide in time with the gating pulse that opens the coincidence gates 4 and 6 respectively. The signal generator stage 7 comprises a tone-frequency oscillator and an electroacoustic transducer for producing an audible call signal.

The high frequency stage is energized directly from a current source, such as a feeder line FL. The other stages, however, receive feeder current through an electronic switch 9 which is normally open, and which is closed by the starting pulse of the high-frequency signal. For this purpose, the high-frequency signal from the high-frequency stage 1 is rectified in a rectifier 10. During the current pauses which form the selector pulses, the electronic switch 9 is kept closed by a storage current source. During the interval of time in which the signal generator stage 7 is in responsive condition, it issues a control voltage through a connection CL which causes the electronic switch 9 to remain in closed condition. In the idle condition of the receiver device, only the high-frequency stage 1 is in operation, whereas the other stages are switched onto the supply of feeder current only when a call signal is received.

In FIG. 1, the signal lines SL are represented by full lines, the feeder connections FL by broken lines, and the control connections CL by dot-and-dash lines.

Figure 2:
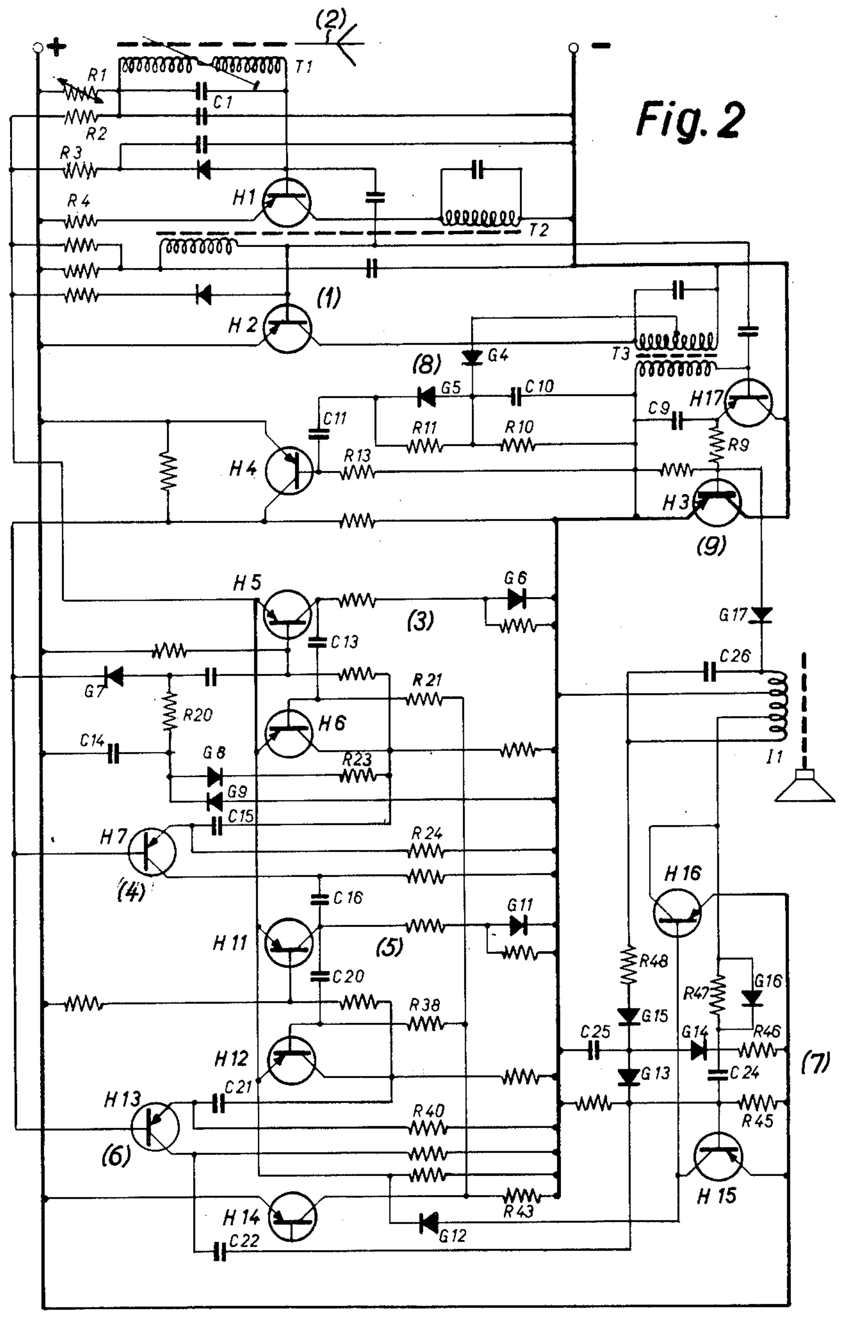

Circuit details of the receiving apparatus will be described with reference to FIG. 2, those circuit components which are conventionally used for the tuning of the HF circuits as well as for adjusting the desired operating points are not designated by reference characters. Such and other conventional and well-known auxiliaries may of course be added and are not essential to the present invention.

The high-frequency stage comprises a transistor H1 and, in the idle condition of the receiving apparatus, operates in B-type operation. After the other stages are switched on, the high-frequency stage converts to A-type operation, so that the current consumption during idle condition is virtually zero. The antenna 2 comprises a strip of laminated $\mu$-metal upon which a coil T1 is mounted. The coil T1 and a capacitor C1 constitute an input tank circuit tuned to the carrier frequency, for example, 30,000 c.p.s. of the call signal. The quality factor of the tank circuit may be relatively low ($Q=1 \ldots 2$), in order to secure minimum distortion in the transmission of the high-frequency pulses. Resistors R1 and R4 are provided for stabilizing the emitter current of the transistor H1.

The amplified high-frequency signal is taken from the collector of the transistor H1 and is applied through a transformer T2 to the base of another transistor H2 for further amplification. The amplified high-frequency signal passes from a transformer T3 to a transistor H17 which, by reflection, produces the control voltage for an electronic switch H3. A capacitor C9, connected through a resistor R9 with the electronic switch H3, maintains the control voltage during the pulse gaps.

From transformer T3 the amplified high-frequency signal also passes to the diode G4 for de-modulation. The members C10, R10 serve for filtering the high-frequency signals. As the time constant for charging the capacitor C10, due to the resistance of the diode G4, is smaller than for discharging, the forward flanks of the selection criteria are passed in the original form over diode G5 to the differentiating members C11, R13. The end flanks, which are flattened by the time constant of C10, R10 have no effect after being differentiated. The resistor R11 serves for discharging the capacitor C11. The transistor H4 amplifies the differentiated forward flanks of the selection criteria and passes them to the first pulse-delay stage as well as to the coincidence gates.

The pulse-delay stages are formed by two monostable multi-vibrators of identical design. One multi-vibrator comprises resistors H5 and H6 and the other comprises resistors H11 and H12. In idle condition, the transistors H6 and H12 are conducting (turned on). The members R21, C13 and R38, C20 determine the time-constant of the pulse delay and have different values for the respectively different receivers. The emitters of transistors H5, H6 and H11, H12 are connected with the positive pole or bus lead of the voltage source through a common diode G12 and through a transistotr H15 which operates as a common emitter resistor. The diodes G6 and G11 prevent the multi-vibrators from responding to fluctuations of the feeder voltage. The first pulse-delay stage is additionally provided with a blocking device which ascertains that this stage can respond only once during a pulse sequence. The operation of this blocking device is as follows:

When the multi-vibrator (H5, H6) responds, the transistor H6, previously conductive, is converted to blocked (turned off) condtion. Now, the capacitor C14 becomes charged through the resistor R23 and the diode G8, whereby the diode G7 is biased through the resistor R20 in the blocking direction. This blocking effect is eliminated only when the feeder voltage is disconnected by the switching transistor H3. Then the capacitor C14 discharges through the diode G9 and through the load constituted by the electronic switch (3).

In principle, the time constant of the pulse delay is dependent upon the leakage current of the transistors H6 and H12, respectively; this leakage current being dependent upon temperature. For temperature compensation, a voltage is introduced through the resistors R21 and R38 which follows the same law of temperature dependence as the leakage current. This renders the time constant independent of temperature. The compensating voltage is tapped off a resistor R43 which is inserted into the collector circuit of a transistor H14 of the same type as the transistors H6 and H12.

The signal-generator stage (7) comprises two transistors H15 and H16. In idle condition of the receiver, the transistor H15 is continuously conducting and is loaded by the pulse-delay stages. The coincidence pulse of the last gating stage furnishes excitation to the signal generator. This has the effect of blocking the transistor H15 and thus rendering the transistor H16 conducting. The collector of the transistor H16 is connected with the base of the transistor H15 through the parallel connection of the diode G16 with the resistor R47 and through the capacitor C24. The oscillator frequency is determined, in one-half wave, by the timing member constituted by the capacitor C24 and the resistor R45, and in the other half-wave by the tuned tank circuit formed by the capacitor C26 and the winding I1 of the tone-frequency transformer, amounting for example, to 3,000 c.p.s. The resistor R48, the diode G15 and the capacitor C25 limit the oscillating duration of the signal generator stage, due to the fact that the capacitor C25 becomes charged. The voltage on the charged capacitor C25 is applied to the base of transistor H15 through the diode G13 and blocks the transistor H15. The residual charge of capacitor C25 is dissipated through the diode G14 and the resistor R46. Derived from the signal generator stage, through the diode G17, is a voltage which maintains the electronic switch (9) closed (turned on) during the oscillating duration of the signal generator stage.

The output of each pulse-delay stage is connected with the input of the next following stage by a coincidence gate (4, 6). The coincidence gates are constituted by the transistors H7 and H13. Their function will be described by the example of the first gating stage.

The output pulse of the first pulse-delay stage is transmitted through the capacitor C15 to the emitter of the transistor H7. The capacitor C15 is reversely charged through the resistor R24 to approximately the feeder voltage. During a portion of the charging-up time the transistor H7 is capable of transmitting a pulse from its base to the collector. This pulse at the collector is passed through the capacitor C16 to the input of the next following pulse-delay stage. The resistors R24 and R40 are so rated that the charging periods of the capacitors C15 and C21 correspond to a desired portion, for example, 20% of the time length of the selector criterion.

Figure 3:
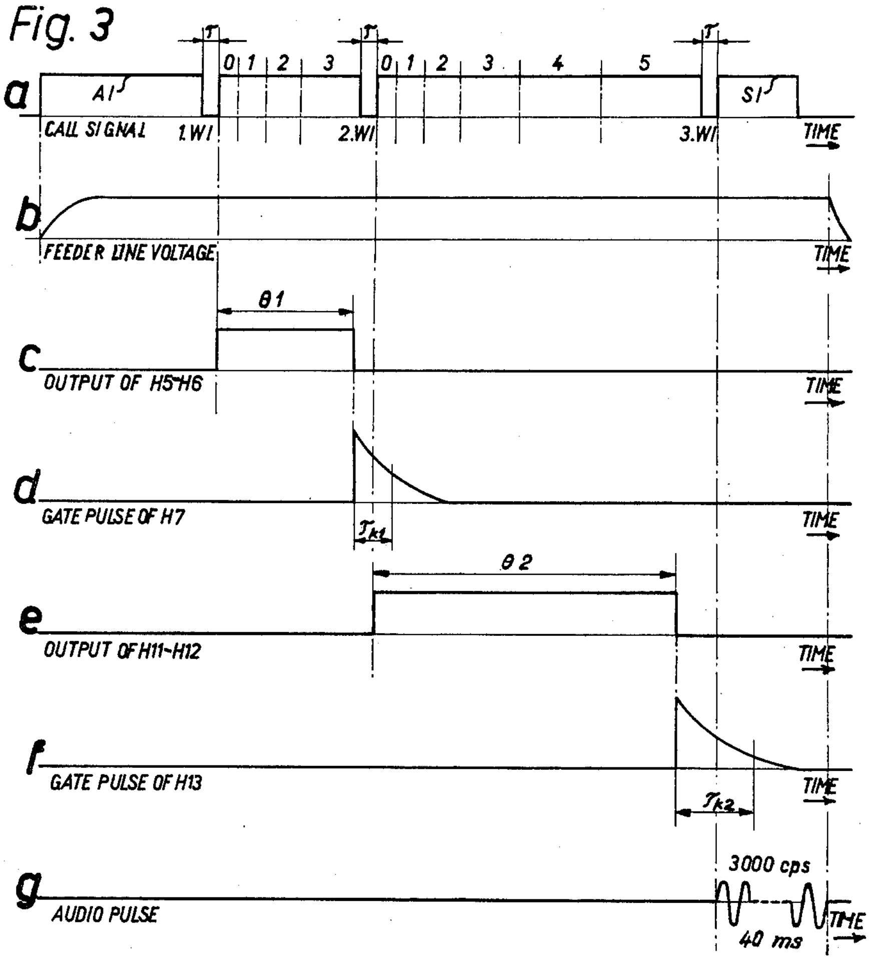
FIG. 3 is a graph showing a group of pulse diagrams explanatory of the functioning of the individual stages in the same receiver.

The performance of the above-described receiving device will be explained presently with reference to the typical pulse diagrams *a* to *g* illustrated in FIG. 3. The horizontal reference lines in these diagrams denote time. Vertically plotted on these reference lines are qualitative voltage values of the pulses.

FIG. 3*a* shows the pulse sequence that constitutes the call signal and is used in the transmitter for modulating the carrier frequency. The starter pulse of the code sequence is denoted by AI. This pulse commences when the operating current is switched on and is followed by the first selector pulse 1.WI in form of a current gap with a duration of $\gamma$ of 0.3 ms., for example. The second and third selector pulses 2.WI and 3.WI, respectively, follow the first pulse given mutual time spacings. Each of these time spacings between the gaps constitutes one of the selector criteria of the call signal. The second selector pulse is simultaneously the end pulse of the first selector criterion and the starting pulse of the second criterion. In the example here illustrated, the second and the third selector pulse may occupy one of ten different positions relative to their respective preceding selector pulses. These ten available positions are indicated by dot-and-dash lines numbered by 0 . . . 3 and 0 . . . 5, respectively. These lines denote the respective end flanks of the available pulses. Accordingly, ten different and selective pulse spacings are available for each individual selector criterion so that the total of 100 different call signals can be formed by suitable combination.

The starting pulse AI causes the electronic switch 9 (FIG. 1, corresponding to transistor H3 in FIG. 2) to respond. This switch then connects the feeder voltage to the receiver stages that are de-energized in idle condition of the receiving device. The course of the feeder voltage thus switched-on by the electronic switch is indicated in FIG. 3*b*.

Assume that the time constants of the two pulse-delay stages (3, 5 of FIG. 1) are chosen so that the receiving device, or rather its signal generator stage, will respond to the call signal according to the pulse diagram shown in FIG. 3*a*, in which an arbitrarily chosen pulse spacing for the two selector criteria is assumed. At the end of the first selector pulse, 1.WI the first multi-vibrator (H5, H6) progresses into the labile condition.

Upon the lapse of a predetermined interval of time $\theta 1$, the multi-vibrator triggers back to the stable starting condition, according to the diagram in FIG. 3*c*. As a result, the capacitor C15 is reversely charged through the resistor R24. During a portion $\gamma_{k1}$ of the charging interval, the transistor H7 is conducting and can transmit the end flank of the second selector pulse 2.WI, this being apparent from being represented in the diagram of FIG. 3*d*. Consequently, the second pulse-delay stage becomes triggered. During a predetermined interval of time $\theta 2$, the second delay stage remains in labile condition according to FIG. 3*e*. Thereafter, the output pulse of the second stage opens the next coincidence gate H13 for the coincidence interval $\gamma_{k2}$ according to FIG. 3*f*, so that the third selector pulse 3.WI releases the signal generator stage. Upon response of the signal generator stage, its oscillator commences to oscillate and remains in oscillating condition for a given period interval of time, for example, 40 ms. (FIG. 3*g*).

The terminating pulse SI need last only as long as is needed until the end flank of the third selector pulse 3.WI is reliably transmitted. The signal generator stage receives its feeder voltage by rectification of the tone frequency (3,000 c.p.s.) through the diode G17, until the capacitor C25 is charged. Thereafter, the transistor H16 remains continuously conducting, and the tone-frequency oscillation terminates so that the feeder voltage vanishes, whereby the starting condition of the receiving device is reestablished.

We claim:

1. A selective-call-system receiver which is selected by responding to a starting pulse followed by a group of selector pulses whose mutual time spacings serve as selection criteria, comprising a plurality of successive pulse-delay stages corresponding in number to the number of selection criteria and having delay times characterizing the receiver, a signal generator stage following the last of said pulse-delay stages, a plurality of coincidence gates connected between each stage and the successive stage, pulse forming means connected to each pulse-delay stage for generating a gating pulse which opens each coincidence gate for a given time interval in response to the output of a pulse from the preceding pulse-delay stage, selector pulse input means connected to the first of said pulse-delay stages and to all of said coincidence gates for passing selector pulses through said gates only when the trailing edges of the selector pulses occur during said gating pulses, whereby a signal can actuate the signal generator stage only when the selector pulse time-spacing corresponds to the delay times characterizing the receiver.

2. A selective-call-system receiver which is selected by responding to a starting pulse followed by a group of selector pulses whose mutual time spacings serve as selection criteria, comprising a plurality of successive pulse-delay stages corresponding in number to the number of selection criteria and having delay times characterizing the receiver, a signal generator stage following the last of said pulse-delay stages, a plurality of coincidence gates connecting respective stages to the successive stages, pulse forming means connected to each pulse-delay stage for generating a gating pulse which opens each coincidence gate for a given time interval in response to the output of a pulse from the preceding pulse-delay stage, pulse input means connected to the first of said pulse-delay stages and to all of said coincidence gates for passing pulses through said gates only when the trailing edges of the selector pulses coincide with said gating pulses, whereby a signal actuates the signal generator stage only when the selector pulse time-spacing corresponds to the delay times characterizing the receiver, said coincidence gates each comprising a transistor having an emitter, a collector and a base, said collector being connected to the respective following stage, said base being connected to said input means for receiving the selector pulses, said pulse forming means including a capacitor connecting the preceding stage to said emitter and a resistor for charging said capacitor, the current in said capacitor during charge thereof serving as the gate pulse 3. A selective-call-system receiver which selected by responding to a starting pulse followed by a group of selector pulses whose time spacings serve as selection criteria, comprising a plurality of successive pulse-delay stages corresponding in number to the number of selection criteria and having delay times characterizing the receiver, a signal generator stage following the last of said pulse-delay stages, a plurality of coincidence gates connecting respective stages to the successive stages, pulse-forming means connected to each pulse-delay stage for generating a gating pulse which opens each coincidence gate for a given time interval in response to the output of a pulse from the preceding pulse delay-stage, selector pulse input means connected to the first of said pulse-delay stages and to all of said coincidence gates for passing selector pulses through said gates only when the trailing edges of the selector pulses coincide with said gating pulses, whereby only when the selector pulse time-spacing corresponds to the delay times characterizing the receiver will a signal actuate the signal generator stage, each of said pulse-delay stages including a monostable multivibrator composed in its idle state of an idling conductive and an idling non-conductive transistor having an emitter, a collector and a base, said multivibrator including a pulse-delaying control capacitor connected from the collector of the idling non-conductive transistor to the base of the idling conductive transistor, said multivibrator having a collector circuit connected to the collector of said idling non-conductive transistor, which collector circuit includes a diode for limiting the stabilizing current flowing to the base of the normally conductive transistor through said capacitor during a short-time fluctuation of feeder voltage.

4. A selective-call-system receiver which is selected by responding to a starting pulse followed by a group of selector pulses whose time spacings serve as selection criteria, comprising a plurality of successive pulse-delay stages corresponding in number to the number of selection criteria and having delay times characterizing the receiver, a signal generator stage following the last of said pulse-delay stages, a plurality of coincidence gates connecting respective stages to the successive stages, including pulse-forming means connected to each pulse-delay stage for generating a gating pulse which opens each coincidence gate for a given time interval in response to the output of a pulse from the preceding pulse-delay stage, pulse input means connected to the first of said pulse-delay stages and to all of said coincidence gates for passing selector pulses through said gates only when the trailing edges of the selector pulses coincidence with said gate pulses, whereby only when the selector pulse time-spacing corresponds to the delay times characterizing the receiver will a signal actuate the signal generator stage, each of said pulse-delay stages including a transistorized monostable multivibrator and blocking means for preventing the other selector pulses from entering the first pulse-delay stage during the delay of a previous pulse in that stage.

5. A selective-call-system receiver which is selected by responding to a starting pulse followed by a group of selector pulses whose time spacings serve as selection criteria, comprising a plurality of successive pulse-delay stages corresponding in number to the number of selection criteria and having delay times characterizing the receiver, a signal generator stage following said pulse-delay stages, a plurality of coincidence gates connecting respective stages to the successive stages, pulse-forming means connected to each pulse-delay stage for generating a coincidence-gate-opening gating pulse in response to the output of a pulse from the preceding pulse delay stage, pulse input means connected to the first of said pulse-delay stages and to all of said coincidence gates for passing pulses through said gates only when the trailing edges of the selector pulses coincide with said gating pulses, whereby only when the selector pulse time-spacing corresponds to the delay times characterizing the receiver will a signal actuate the signal generator stage, each of said pulse-delay stages including a transistorized monostable multivibrator and protective means for preventing the other selector pulses from entering the first pulse-delay stage during the delay of a previous pulse in that stage, said protective means in said first pulse-delay stage including a gating device which becomes non-conductive in response to the delay operation of said stage.

6. A receiver responsive to at least one predetermined time-spacing between selector pulses of an incoming signal comprising at least one pulse-delay stage of a given delay period having an input and an output signal, input means for passing selector pulses to said delay stage, pulse time-extending means connected to the output of said pulse-delay stage for producing a time-broadening gating pulse in response to issuance by said pulse-delay means of a pulse delayed therein, a coincidence gate having two input circuits one of which is connected to said pulse time-extending means and is opened thereby, said input means including differentiating means, the other of said input circuits being connected to said differentiating means for receiving one edge of said selector pulses so as to pass the edge through said gate only if the delay imposed upon the one selector pulse equals the spacing to the next selector pulse.

References Cited by the Examiner

UNITED STATES PATENTS

| | | | |
|---|---|---|---|
| 2,943,299 | 6/1960 | Dunn | 340—167 |
| 3,004,241 | 10/1961 | Konig | 340—167 |

NEIL C. READ, *Primary Examiner.*

ROBERT H. ROSE, *Examiner.*